J. GUSTAFSON.
TIDE WATER STORAGE SYSTEM.
APPLICATION FILED NOV. 4, 1916.
1,255,159.
Patented Feb. 5, 1918.
2 SHEETS—SHEET 2.
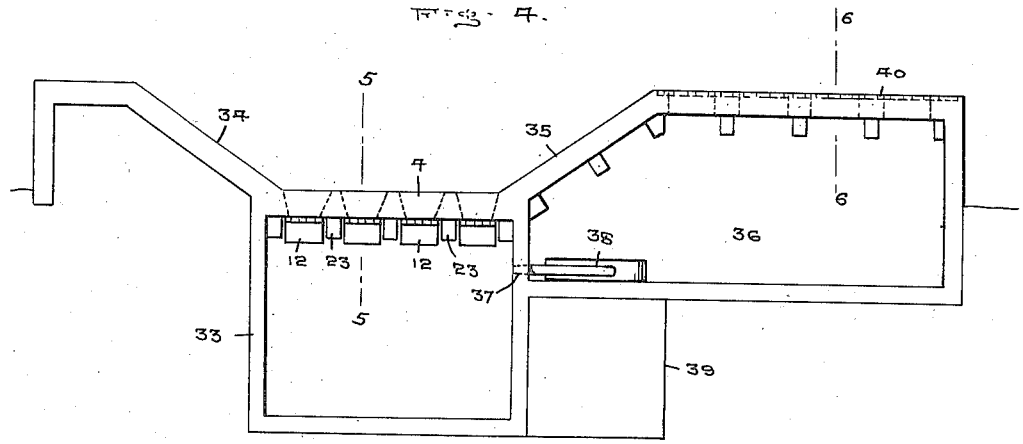
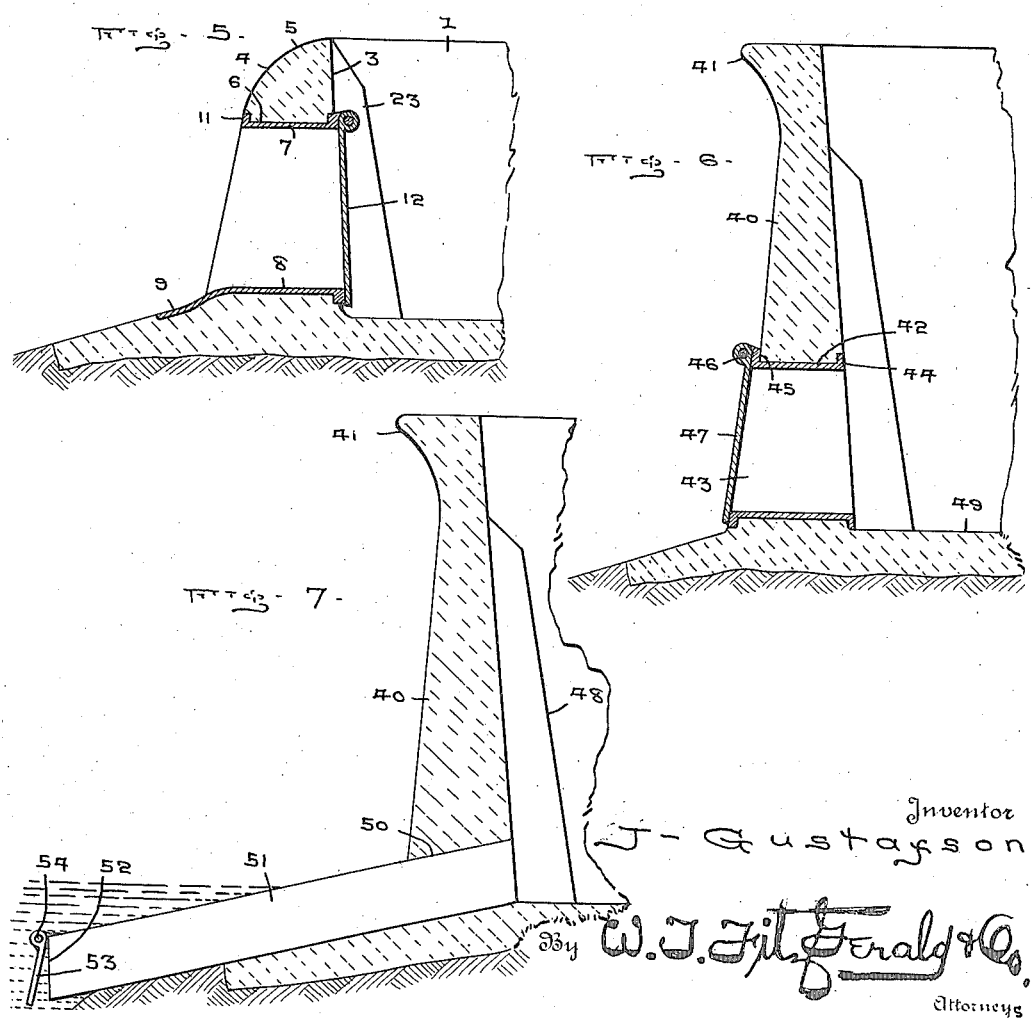

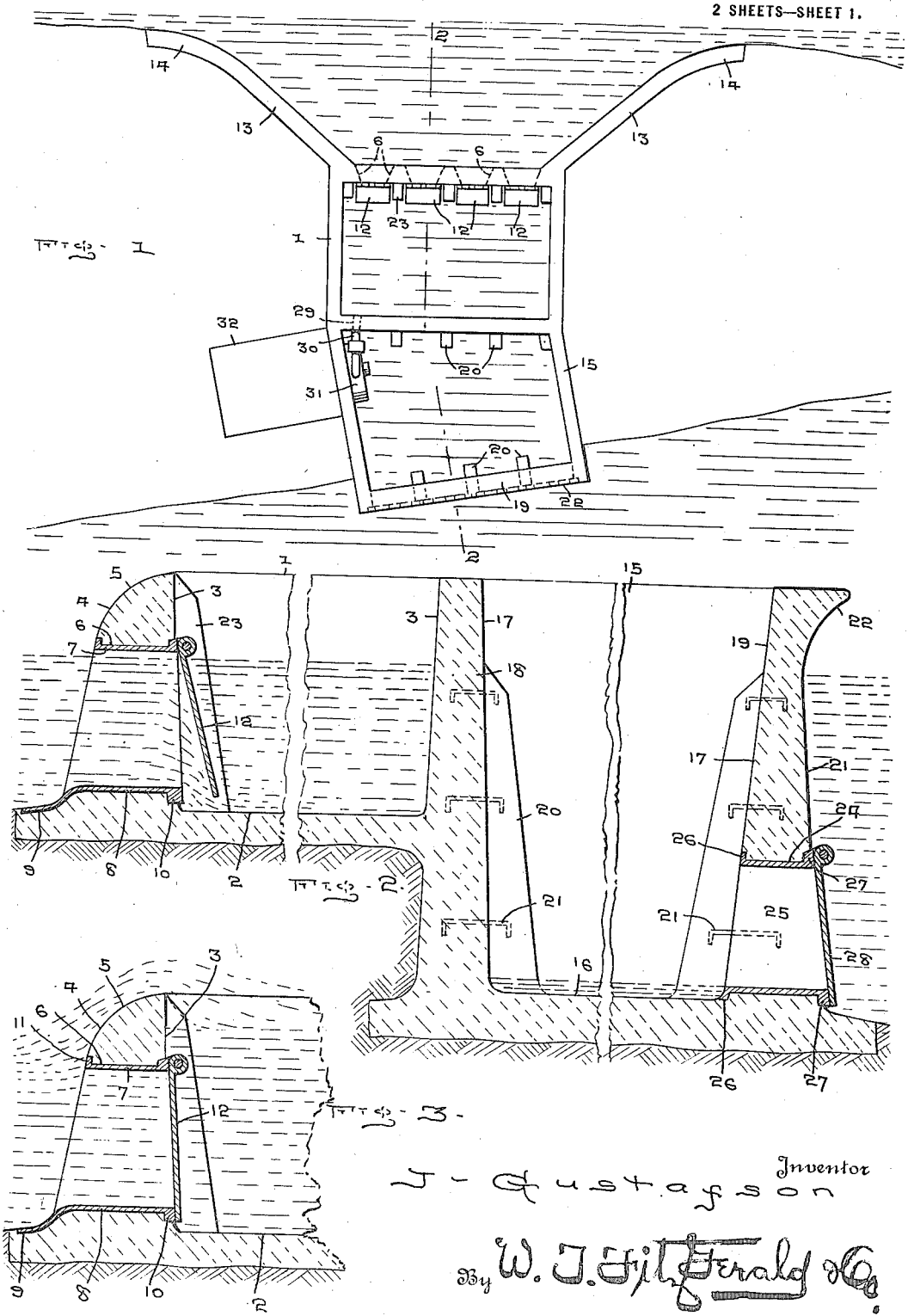
J. GUSTAFSON.
TIDE WATER STORAGE SYSTEM.
APPLICATION FILED NOV. 4, 1916.
1,255,159.
Patented Feb. 5, 1918.
2 SHEETS—SHEET 1.

UNITED STATES PATENT OFFICE.

JACOB GUSTAFSON, OF BOISE, IDAHO.

TIDE-WATER-STORAGE SYSTEM.

1,255,159.          Specification of Letters Patent.          Patented Feb. 5, 1918.

Application filed November 4, 1916. Serial No. 129,524.

*To all whom it may concern:*

Be it known that I, JACOB GUSTAFSON, a citizen of Finland, residing at Boise, in the county of Ada and State of Idaho, have invented certain new and useful Improvements in Tide-Water-Storage Systems; and I do hereby declare the following to be a full, clear, and exact description of the invention, such as will enable others skilled in the art to which it appertains to make and use the same.

My invention relates to hydraulic power and more particularly to a tide water storage system comprising suitable reservoirs of any preferred size and construction and also by the employment of ponds or lakes formed for the purpose of storing the water at high tide, whereby the release of the water thus stored may be made through the medium of auxiliary reservoirs, through properly constructed openings and over any preferred kind of power producing appliances.

The water at high tide is accumulated in the main or storage reservoirs which are preferably adjacent to the auxiliary reservoirs and properly connected therewith by suitable passage ways for the water and I thus utilize the force of the water as it passes from the main reservoirs into the auxiliary reservoirs, and the water thus delivered in the auxiliary reservoirs from the main reservoir will automatically act upon the closure gates and pass out of the auxiliary reservoir at low tide.

It will thus be seen that I have provided means for continuously utilizing the force of the tides by filling the storage reservoirs at high tide and utilizing the accumulated water by passing it into the auxiliary reservoir over suitable power devices and subsequently providing that the water will pass from the auxiliary reservoir automatically after the ocean has receded at low tide.

Another object of the invention is the provision of a hydraulic power reservoir embodying a main reservoir adapted to receive water proportionately to the rise of the tide and an auxiliary reservoir arranged adjacent to and disposed below the main reservoir and designed to receive the water that is discharged from the main reservoir, this auxiliary reservoir being provided with an outlet opening whereby the water within the auxiliary reservoir may be discharged as the tide recedes.

A further object of the invention is to provide a main reservoir with an inlet opening that is provided with a check gate which is designed to be opened by the inflow of the tide as it rises and also adapted to be immediately closed by the pressure of the water within the main reservoir as the tide recedes.

A still further object of the invention is to provide the auxiliary reservoir with an outlet opening which is provided with a check gate that is designed to be normally held closed through the medium of the tide pressure, this check gate adapted to open under the pressure of the water within the auxiliary reservoir when the tide recedes.

A still further object of the invention is to provide the main reservoir with a series of entrance openings in its forward wall having check gates closing each of said openings and rounding the outer forward edge of the wall so that in addition to the tide that is admitted through the entrance openings, the waves as they come inwardly toward the device will be permitted to wash over the wall into the main reservoir, thus storing an additional amount of water due to the force of the waves.

With these and other objects in view as will appear as the description proceeds, the invention comprises the various novel features of construction, combination and arrangement of parts as will be more fully described hereinafter and set forth with particularly in the appended claim.

Referring to the drawings,

Figure 1 represents a plan view of my improved hydraulic power reservoir shown, in this instance, positioned across a peninsula between the sea and a bay.

Fig. 2 is a vertical transverse sectional view taken on the line 2—2 of Fig. 1.

Fig. 3 is a fragmentary vertical sectional view taken through the forward wall of the main reservoir showing how the force of the waves is used to store additional water in the reservoir to that stored by the rise in the tide.

Fig. 4 is a plan view of a slightly different arrangement of my hydraulic power reservoir showing another way in which it may be used.

Fig. 5 is a vertical transverse sectional view taken on the line 5—5 of Fig. 4.

Fig. 6 is a vertical transverse sectional view taken on line 6—6 of Fig. 4.

Fig. 7 is a vertical transverse sectional view taken on the same line as Fig. 6 but showing a discharge conduit in the place of the usual discharge opening.

Similar characters of reference are used to denote like parts throughout the accompanying drawings and the following description.

Referring more particularly to the drawings, it will be seen that my preferred form of hydraulic power reservoir, in this instance, is positioned between the sea and a bay, and as shown consists of a main reservoir 1, which, in this instance, is of substantially rectangular construction. This main reservoir, however, may be constructed of any desired shape or formation and may be of any suitable depth as found best suited for the purpose intended. The inner surfaces of the walls forming the main reservoir converge downwardly toward the bottom 2 of the reservoir as indicated by the numeral 3 so as to strengthen and reinforce the walls adjacent the bottom of the main reservoir.

The forward wall 4 of this reservoir has its outer surface inclined downwardly and outwardly from its upper edge so as to strengthen and reinforce it, the upper forward edge of the wall being rounded over to its inner surface at 5 so that as the waves come inwardly toward the wall with the tide they may freely and readily pass over this rounded portion into the main reservoir 1.

This forward wall 4 is further provided with a series of inlet openings 6 which converge inwardly of the main reservoir as clearly shown in Fig. 1 of the drawings. Each of these openings 6 is lined or faced with an inner casing 7, the bottom wall 8 thereof being provided at its forward edge portion with a downwardly and outwardly curved wear plate 9. In order to effectively hold and retain this casing 7 within the opening 6, marginal flanges 10 and 11 are provided at the opposite side edges of the casing designed to brace the opposite sides of the front wall. Hinged to the inner upper edge of each of these casings 7 is a check gate 12 which is designed to completely close the inner end of each of these casings. As shown, each of these check gates 12 are hinged to swing to a closed position under their own weight, and are designed to be normally held closed through the medium of the pressure of the volume of water within the main reservoir. Each of these check gates are adapted to be opened by the pressure of the tide as it rises so as to admit water to the main reservoir in proportion to the rise of the tide. When the tide begins to recede, each of these check gates will be immediately closed by the pressure of the water within the main reservoir, thus preventing any of its escape.

Extending outwardly from the opposite end edges of the front wall 4 are diverging walls 13, the extreme outer ends of which are curved as indicated by the numeral 14, these diverging walls serving to form a mouth or entrance passage for the water into the main reservoir.

Formed integral with the main reservoir is an auxiliary reservoir 15, which, in this instance, is slightly larger than the main reservoir and of a greater depth than it, the bottom 16 of the auxiliary reservoir being disposed below the bottom 2 of the main reservoir any desired distance so that the water within the main reservoir may be precipitated from the main reservoir into the auxiliary reservoir to advantage in driving turbines or other hydraulic power devices. The inner surfaces of the walls forming the auxiliary reservoir converge downwardly toward the bottom as indicated by the numeral 17 so as to strengthen and reinforce the walls constituting it. Each of the opposite walls 18 and 19 are reinforced through the medium of suitably formed buttresses 20 that extend upwardly from the bottom 16 to points adjacent the opposite edge of the auxiliary reservoir. These buttresses are each provided with tie rods or anchoring elements 21 that have one end anchored within the buttresses and the other end anchored within the walls 18 and 19 respectively so as to rigidly reinforce and strengthen the connection of the buttresses with the walls 18 and 19 respectively.

The outer surface of the wall 19, which we will term the rear wall, is inclined downwardly and outwardly from its upper end portion as indicated by the numeral 21 so as to strengthen and reinforce the wall 19, the upper end portion of this outer surface of the wall 19 being inclined upwardly and outwardly so as to provide an overhanging edge 22, which serves as a break water and tends to deflect the waves or water backwardly as it is dashed against the outer surface 21 of this wall, and thus prevent any water from the bay being washed over the wall 19 into the auxiliary reservoir.

It may be found desirable to reinforce the rear side of the forward wall 4 of the main reservoir, and in order to do this I provide buttresses 23 that are disposed between each of the check gates 12 and extend from the bottom upwardly to the upper edge of the wall.

The rear wall 19 of the auxiliary reservoir is provided at its bottom with a series of transversely extending discharge openings 24 in each of which is arranged a casing 25, that is provided at its opposite marginal side edge with flanges 26 and 27 respectively, each serving to embrace the opposite sides of the wall 19 and to effectively and securely retain the casing in position within the opening 24. Each of these casings 25 is provided with a check gate 28 hinged at its upper edge to the upper edge of the marginal flange 27, said gate being of sufficient size to completely cover the outer end of the casing 25, thus forming an effective closure for it. As shown the check gate 28 will hold itself closed through the medium of its own weight due to the fact that it is hinged and disposed upon an incline.

In order that the water may be discharged from the main reservoir 1 into the auxiliary reservoir 15 I provide a discharge opening 29, shown by dotted lines in Fig. 1, to which may be attached a suitable conveyer pipe 30, that may lead to a turbine or other suitable hydraulic power device 31 whereby the force of the water as it gravitates from the main or upper reservoir into the lower or auxiliary reservoir may be utilized for power purposes. This turbine or hydraulic power device 31 may be suitably connected into a power house which is conventionally represented by the numeral 32.

In the operation of the device, it will be apparent that as the tide comes in from the sea that the water will pass inwardly through the casings 7 against the check gates 12, thus opening them and allowing water to flow into the main reservoir in proportion to the rise of the tide. When the water within the main reservoir has reached the high tide level, additional water may be accumulated within it by the waves washing up over the curved upper edge 5 of the forward wall 4 that come upwardly with the tide as clearly indicated in Fig. 3 of the drawings. By allowing the waves to wash over the wall into the tank, the tank can be practically filled with water to be used subsequently for power purposes.

At the same time that the tide rises in the sea and fills the main reservoir, the tide in the bay is also rising, which rising tide will serve to exert a sufficient amount of pressure against each of the check gates 28 to hold them in closed position and thus prevent any water in the auxiliary reservoir from the bay due to the rise of the tide.

When it is desired to use the water in the main reservoir for power purposes, it can be discharged at will through the discharge opening 29 into the turbine or hydraulic device and subsequently discharged into the auxiliary reservoir.

When the tide begins to recede and has receded sufficiently so that the level of the water in the bay is below the check gates 28, the pressure of the volume of water that has been discharged into the auxiliary reservoir will exert a sufficient outward pressure against the check gates 28 to open them and allow the water within the main reservoir or any water that is discharged into it during the operation of the hydraulic power device may be readily and freely discharged through the casings 25 arranged within the discharge openings 24.

In Fig. 4 will be seen another way in which my hydraulic power reservoir may be used, and the device as constructed in this instance is designed to be used in connection with a body of water, influenced by the tides.

This form of device comprises a main reservoir 33 which may be of any suitable size, shape and construction and is provided with a forward wall substantially identical in construction with the forward wall 4 of the device previously described, therefore, it is not thought necessary to give a detailed description thereof, as it is believed the same reference numerals heretofore used will apply to this forward wall construction. This wall is also provided with the same kind of check gates as hereinbefore described by the numeral 12.

The main reservoir 33 in this instance is provided with walls 34 and 35 that extend outwardly from the opposite ends of the forward wall 4 and serve to provide a converging entrance opening or passage for the water from the sea into the main reservoir. The wall 35 serves as one of the walls of the auxiliary reservoir 36, which latter is disposed adjacent to the main reservoir as clearly shown in Fig. 4. This auxiliary reservoir like the auxiliary reservoir 15 is of a depth greater than that of the main reservoir and is designed to receive the water from the main reservoir as it is discharged through the discharge opening 37 into the turbine or other hydraulic power device 38 each connected up with suitable power machinery arranged within the power house 39 that may be conveniently located adjacent the device.

The forward wall 40 of the auxiliary reservoir is also thickened at its lower or bottom portion so as to strengthen it, the upper forward edge of the wall being curved outwardly so as to provide an overhanging edge 41, this overhanging edge 41 in connection with the wall 40 serving to form a break water wall which is designed to break and deflect the waves back into the sea when they strike against it.

The lower bottom edge of this wall 40 is also provided with a series of outlet openings 42 in each of which is arranged a casing 43 provided at its opposite edges with marginal flanges 44 and 45. Hinged to each of the flanges 45 as indicated by the numeral 46 is a check gate 47, which is of sufficient size to completely cover the discharge or outer end of the casing 43, each of said check gates being normally held closed through the medium of their own weight or through the medium of the pressure of the tide or the force of the waves against them.

The wall 35 and the wall 40 are each reinforced by suitably constructed buttresses 48 that extend upwardly from the bottom 49 of the auxiliary reservoir to points adjacent the upper edges of these walls.

The operation of this form of power reservoir is substantially the same as that hereinbefore described the water passing through the sea into the main reservoir and subsequently discharged into the auxiliary reservoir in order that the force of the gravity of the water in its passage from the main reservoir into the auxiliary reservoir may be utilized to drive a turbine or other suitable hydraulic power device.

In Fig. 7 will be seen another way in which the water may be discharged from the auxiliary reservoir. In this particular construction, the wall 40 is provided adjacent its lower edge with a series of openings 50 in each of which is arranged an outwardly and downwardly discharge conduit 51, the outer end 52 of this conduit being disposed in a plane below that of low tide and also below the bottom of the auxiliary reservoir. The outer end 52 of this conduit 51 is provided with a check gate 53 hinged at its upper end as indicated at 54 in the conduit end 52.

By this construction, it will be apparent that the water from the auxiliary reservoir may be discharged through the conduit 51 into the sea at intervals and at that interval at which the tides recede after they have been washed inwardly against the wall 40. Therefore, it will be seen that as the tides are washed inwardly the check gates 53 will be closed and as the tide recedes outwardly into the sea, the check gates 53 will open thus permitting the escape of a portion of water within the auxiliary reservoir.

What I claim is:

A hydraulic power producing system comprising a main reservoir having a sea wall provided with a plurality of inlet openings, said sea wall having its seaward edge rounded over to its inner edge, check gates for each of said inlet openings adapted to open under flood tide to permit the waves to freely wash over said sea wall and completely fill said main reservoir, an auxiliary reservoir disposed in a plane below that of said main reservoir and having a plurality of outlet openings in its sea wall, an upwardly and outwardly curved overhanging edge carried by said last named sea wall to deflect the waves back into the sea and prevent them from washing over the sea wall into the auxiliary reservoir, check gates adapted to close said outlet openings under flood tide, and means establishing communication between said main reservoir and auxiliary reservoir.

In testimony whereof I have signed my name to this specification.

JACOB GUSTAFSON.